(12) United States Patent
Schneider et al.

(10) Patent No.: US 10,351,132 B2
(45) Date of Patent: Jul. 16, 2019

(54) CONTROL SYSTEM AND CONTROL METHOD FOR DRIVING A MOTOR VEHICLE

(71) Applicant: Lucas Automotive GmbH, Koblenz (DE)

(72) Inventors: Georg Schneider, Urbar (DE); Sascha Heinrichs-Bartscher, Neuwied (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 0 days.

(21) Appl. No.: 15/823,715

(22) Filed: Nov. 28, 2017

(65) Prior Publication Data
US 2018/0154891 A1 Jun. 7, 2018

(30) Foreign Application Priority Data
Dec. 2, 2016 (DE) .......................... 10 2016 014 379

(51) Int. Cl.
*B60W 30/09* (2012.01)
*B60T 7/12* (2006.01)
(Continued)

(52) U.S. Cl.
CPC ............. *B60W 30/09* (2013.01); *B60T 7/124* (2013.01); *B60T 7/22* (2013.01); *B60T 8/00* (2013.01); *B60T 8/17* (2013.01); *B60T 8/17558* (2013.01); *B60W 10/18* (2013.01); *B60T 2201/02* (2013.01); *B60T 2201/022* (2013.01); *B60T 2201/024* (2013.01); *B60T 2201/16* (2013.01); *B60W 2520/10* (2013.01); *B60W 2550/20* (2013.01)

(58) Field of Classification Search
CPC .. B60W 30/09; B60W 10/18; B60W 2520/10; B60W 2550/20; B60T 7/124; B60T 7/22; B60T 8/00; B60T 8/17; B60T 8/17558; B60T 2201/02; B60T 2201/022; B60T 2201/024; B60T 2201/16
USPC .......................................... 701/301; 340/436
See application file for complete search history.

(56) References Cited

U.S. PATENT DOCUMENTS

2010/0023234 A1* 1/2010 Kameyama ........... B60W 30/08
701/70

FOREIGN PATENT DOCUMENTS

DE 102008059915 7/2008
DE 102007027138 12/2008
(Continued)

*Primary Examiner* — Marthe Y Marc-Coleman
(74) *Attorney, Agent, or Firm* — Tarolli, Sundheim, Covell & Tummino LLP

(57) ABSTRACT

Provided is a control system for use in an own motor vehicle adapted to: detect a first other motor vehicle participating in traffic in front of the own motor vehicle and a second other motor vehicle in the rear of the own motor vehicle using at least one surroundings sensor; determine a current driving situation of the own motor vehicle with respect to the current driving situation of the first and second other motor vehicles based on the movements of the first and/or second other motor vehicles and the own motor vehicle; repeatedly determine a measure of a brake requirement in the form of, for example, a time until the beginning of a deceleration; and, provided that a necessity measure exceeds a predetermined threshold, trigger a deceleration of the own vehicle at a point in time which lies before the determined time until the beginning of a deceleration.

6 Claims, 2 Drawing Sheets

(51) Int. Cl.
*B60T 7/22* (2006.01)
*B60W 10/18* (2012.01)
*B60T 8/00* (2006.01)
*B60T 8/17* (2006.01)
*B60T 8/1755* (2006.01)

(56) References Cited

FOREIGN PATENT DOCUMENTS

| | | |
|---|---|---|
| DE | 102012022335 | 5/2013 |
| WO | 2010049192 | 5/2010 |
| WO | 2015188904 | 12/2015 |

* cited by examiner

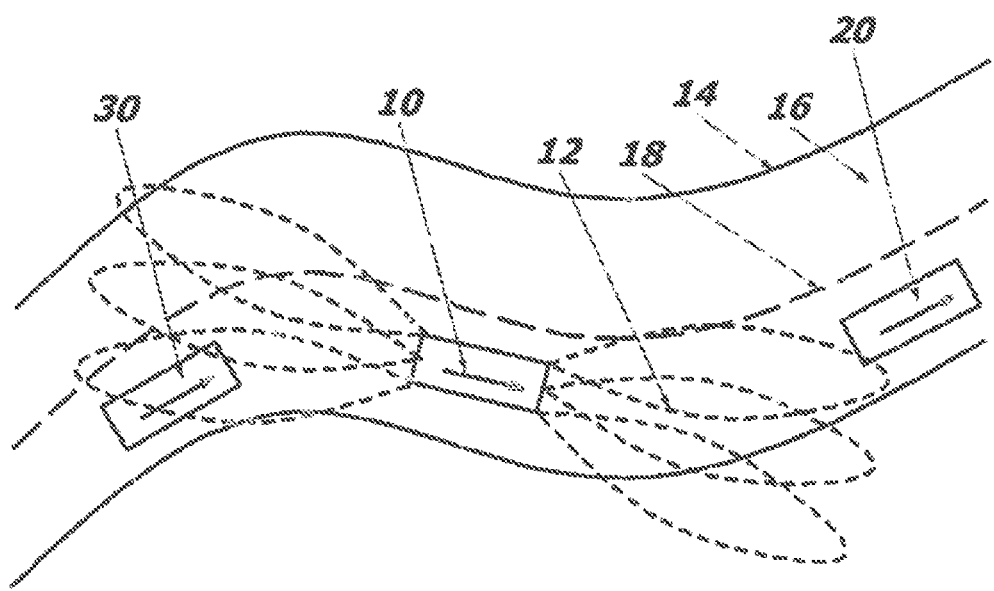

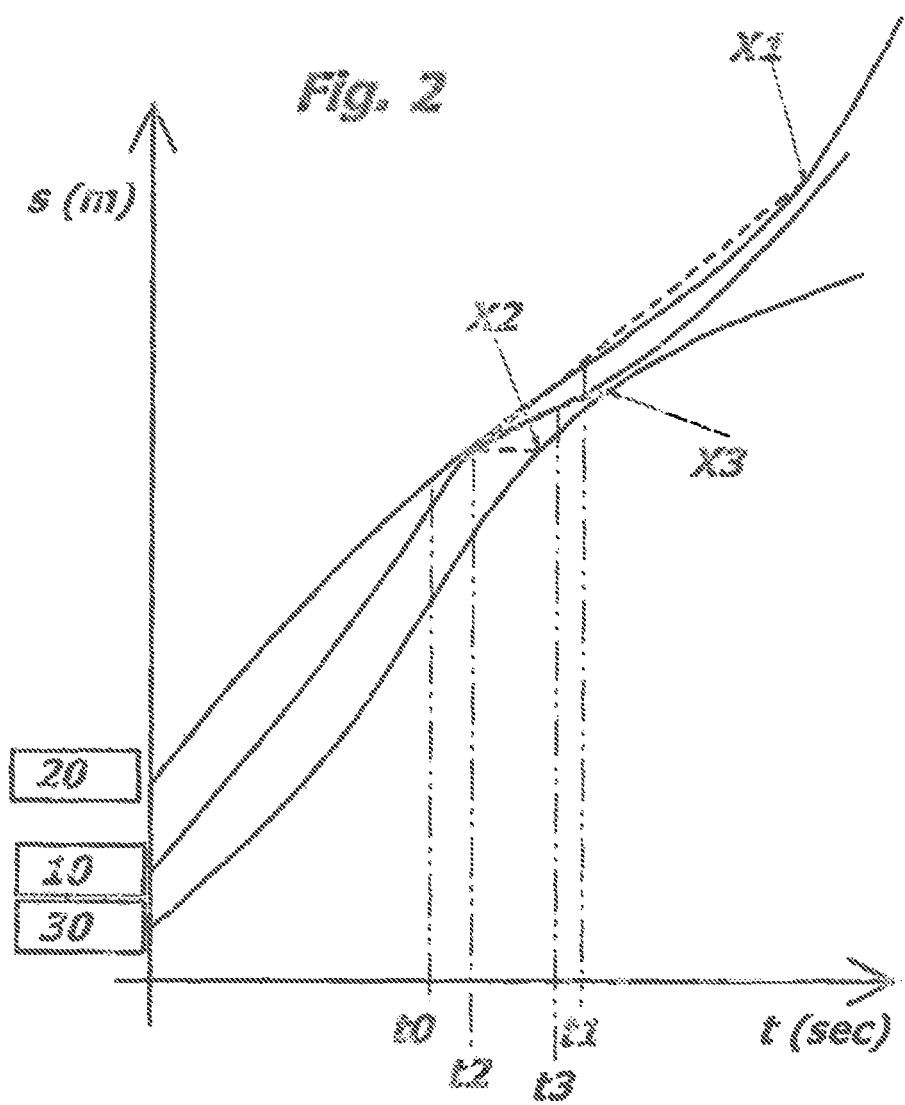

CONTROL SYSTEM AND CONTROL METHOD FOR DRIVING A MOTOR VEHICLE

RELATED APPLICATION

This application claims priority from German Application No. 10 2016 014 379.7, filed Dec. 2, 2016, the subject matter of which is incorporated herein by reference in its entirety.

BACKGROUND OF THE INVENTION

There are disclosed herein a control system and a control method for driving a motor vehicle in order to avoid a collision with a motor vehicle in front or behind. This control system and the control method are based in particular on a surroundings sensor in the own motor vehicle and assist the driver thereof or an autonomously driven motor vehicle. In the case of semi-autonomous motor vehicles and autonomously controlled motor vehicles, the safety of the occupants of the motor vehicle is to be increased.

PRIOR ART

Current advanced driver assistance systems (ADAS) in motor vehicles provide a large number of monitoring and information functions to make a motor vehicle safer to drive. The surroundings of the motor vehicle are thereby monitored, based on surroundings data obtained from one or more surroundings sensors located on the motor vehicle, with regard to the route of the own motor vehicle.

Known driver assistance systems determine, for example, whether the motor vehicle is in a traffic lane and whether the driver is unintentionally drifting to one side of the traffic lane or is on the point of leaving the traffic lane. Such driver assistance systems generate a "picture" of the road, and in particular of the traffic lane, from the surroundings data obtained. Objects are thereby detected and followed during driving, such as, for example, a kerbside, traffic lane markings, direction arrows, etc.

Current driver assistance systems also include so-called "blind spot monitors". Such monitors determine, for example by means of radar, lidar, video or the like, whether there is another motor vehicle, a road user or an object at the side of and/or behind the motor vehicle so that a lane change or turning of the own motor vehicle could result in a collision therewith.

Furthermore, in so-called ACC (adaptive cruise control) systems, an automatic speed control of the own motor vehicle is adapted to the speed of a motor vehicle in front. A specific distance is thereby always to be maintained relative to the motor vehicle in front. For this purpose, such systems determine a movement direction and/or a speed of the motor vehicle in front in order to prevent the own motor vehicle from crossing the path of the motor vehicle in front in such a manner that a critical situation occurs. This concerns on the one hand lane changing or turning procedures and on the other hand the avoidance of rear-end collisions.

A speed control system in a motor vehicle, which controls the distance relative to a motor vehicle in front, and an emergency braking system in a motor vehicle are driver assistance systems which react to other road users, for example other motor vehicles or pedestrians. For this purpose, the most relevant road user is chosen in order to perform a corresponding action.

This so-called path selection or target selection frequently takes place by estimating the trajectory of the own motor vehicle and selecting the road user that is on that trajectory. Estimation of the trajectory is generally based on knowledge of a speed and yaw rate of the own motor vehicle, as well as on other available information, for example road markings.

In motor vehicles driven by persons, driver assistance systems mostly provide an information function in order to warn the driver of a critical situation or a corresponding manoeuvre or in order to propose to the driver a suitable manoeuvre for the own motor vehicle. Similarly, driver assistance systems can also be used in autonomously controlled motor vehicles to provide the autonomous controller with the corresponding surroundings data.

Underlying Problem

On account of different driving situations, a miscalculation, for example, of the speed or distance of the own motor vehicle/of a foreign motor vehicle in front or behind can lead to a collision of the own motor vehicle with the motor vehicle in front or to a rear-end collision of the vehicle behind. Such driving situations also occur in heavy traffic, possibly at high speed, and (too) late reactions result in unsafe scenarios which can often only be resolved by heavy braking or swerving in order to avoid a rear-end collision. Such dangerous braking procedures and/or driving manoeuvres can also endanger other road users and/or impair driving comfort.

Accordingly, the object is to provide a control system and a control method for a motor vehicle for driving the motor vehicle safely.

Proposed Solution

The object is achieved by a control system and a control method having the features of the respective independent claims.

A control system for use in an own motor vehicle is adapted and determined, based on surroundings data obtained by at least one surroundings sensor arranged at the own motor vehicle, to detect motor vehicles in the front and in the rear of the own motor vehicle, and preferably to detect objects in front. The at least one surroundings sensor is adapted to provide, to an electronic control of the control system, the surroundings data representing an area in front of, next to and/or behind the own motor vehicle. The control system is at least adapted and determined to detect a first other motor vehicle participating in traffic in front of the own motor vehicle by means of the at least one surroundings sensor, to detect a second other motor vehicle participating in traffic in the rear of the own motor vehicle by means of the at least one surroundings sensor, to determine movements of the first and/or second other motor vehicles relatively (i) to a lane, on which the first and/or second motor vehicles or the own motor vehicle are, or (ii) relatively to the own motor vehicle, to determine a current driving situation of the own motor vehicle with respect to the current driving situation of the first and second other motor vehicles based on the movements of the first and/or second other motor vehicles and movements of the own motor vehicle, based on the current driving situation of the own motor vehicle with respect to the current driving situation of the first and second other motor vehicles, repeatedly to determine a measure of a brake requirement in the form of (i) a necessity measure, (ii) a time until the beginning of a deceleration and (iii) a deceleration measure for the own vehicle, and provided that the necessity measure exceeds a predetermined threshold, to trigger a deceleration of the own vehicle at a point in time which lies before the time until the beginning of a deceleration, wherein the triggered deceleration is less than the determined deceleration measure for the vehicle.

While current vehicle functions which intervene in the longitudinal dynamics of the vehicle, including automatic emergency braking (AEB) systems, are based substantially on the detection, by means of sensors, of the front region of the vehicle and of the own driving behaviour (current speed and current acceleration/deceleration), the solution presented herein additionally integrates into the control of the longitudinal dynamics the detection, by means of sensors, of the rear region of the own vehicle. This improves the system in various respects. Detection, by means of sensors, of the vehicle surroundings at the rear can be based, for example, inter alia on radar sensors for the rear and the corner regions, ultrasonic sensors from a parking assist system, rearview cameras, for example a reversing camera, lidar sensors, etc.

Through knowledge of the driving situation in the rear region of the own vehicle, the behaviour of the own vehicle, for example, in the case of emergency braking can be suitably adapted to the situation. If, for example, there is a lorry (or other vehicle) behind the own vehicle with too small a safe distance, braking that is considered necessary is begun earlier but at the same time with less deceleration. This reduces the risk of a rear-end collision by the vehicle behind. Should it nevertheless not be possible to prevent the rear-end collision owing to the specific driving data of the own vehicle and of the foreign vehicle, at least the severity thereof is reduced, because the rear-end collision would probably occur at a lower relative speed.

In current systems for controlling the longitudinal dynamics, if this information is not used in the manner described above, a braking operation results which is carried out later and with greater deceleration. This also increases the likelihood of a collision by a following vehicle whose driver is not paying attention. Such a rear-end collision is also more serious compared to one which follows lighter, earlier braking.

In a variant, the control system presented herein is configured and designed to begin the triggering of the deceleration of the own vehicle in the form of a recommendation for the driver of the own motor vehicle. This recommendation can be given acoustically, visually or haptically. For example, a haptic recommendation can be given to the driver by making an accelerator and/or brake pedal vibrate, the compliance of the brake pedal or the frequency of vibration increasing noticeably for the driver when the recommended deceleration has been achieved. In a (semi-)autonomous motor vehicle, the recommendation is begun—optionally independently of a braking intervention by the driver—as a specification via a brake system of the own motor vehicle.

In a further variant of the control system presented herein, the control system is adapted and designed, after triggering the deceleration of the own vehicle, repeatedly to determine the driving situation of the own vehicle with respect to the current driving situation of the first and second other motor vehicles and repeatedly to determine a probable intensity of a possible collision with the first and/or second other motor vehicle. In dependence on the probable intensity of a possible collision with the first and/or second other motor vehicle, the control system presented herein changes the measure of the deceleration that is begun.

In a further developed variant of the control system presented herein, a measure of the probable intensity of a possible collision with the first and/or second other motor vehicle is a current relative acceleration, a current relative speed, and/or a current distance between the own motor vehicle and the first and/or second other motor vehicle.

In a further variant of the control system, there is used as an alternative or additional measure of the probable intensity of a possible collision with the first and/or second other motor vehicle an intention model of the driver of the own motor vehicle and/or intention models of the first and/or second other motor vehicle.

Overall, the measure of the recommended deceleration for risk minimisation between a front crash and a rear crash is compared repeatedly (for example continuously over time or at intervals).

With a control method presented herein, in an own motor vehicle, based on surroundings data obtained by at least one surroundings sensor arranged at the own motor vehicle, motor vehicles in the front and in the rear of the own motor vehicle, and preferably objects in front, are detected, wherein surroundings data representing an area in front of, next to and/or behind the own motor vehicle are provided. The control method comprises the following steps: detecting a first other motor vehicle participating in traffic in front of the own motor vehicle, detecting a second other motor vehicle participating in traffic behind the own motor vehicle, determining movements of the first and/or second other motor vehicle relatively (i) to a lane, on which the first and/or second motor vehicle or the own motor vehicle are, or (ii) relatively to the own motor vehicle, determining a current driving situation of the own motor vehicle with respect to the current driving situation of the first and second other motor vehicles from the movements of the first and/or second other motor vehicle and movements of the own motor vehicle, repeatedly determining, based on the current driving situation of the own motor vehicle with respect to the current driving situation of the first and second other motor vehicles, a measure of a brake requirement in the form of (i) a necessity measure, (ii) a time until the beginning of a deceleration and (iii) a deceleration measure for the own vehicle, and, providing the necessity measure exceeds a predetermined threshold, triggering a deceleration of the own vehicle at a point in time which lies before the determined time until the beginning of a deceleration, wherein the triggered deceleration is less than the determined deceleration measure for the own vehicle.

The control method presented herein is adapted and designed to begin the triggering of the deceleration of the own vehicle in the form of a recommendation for the driver of the own vehicle or (semi-)autonomously via a brake system of the own motor vehicle.

It is clear that the aspects and features described above can be combined as desired in a control system and/or a control method. Although some of the features described hereinbefore have been described in relation to a control system, it will be appreciated that these features may also apply to a control method. Likewise, the features described above in relation to a control method may apply correspondingly to a control system.

BRIEF DESCRIPTION OF THE DRAWING

Further objectives, features, advantages and possible applications will become apparent from the following description of exemplary embodiments, which are not to be interpreted as limiting, with reference to the associated drawings. In the drawings, all the features which are described and/or depicted show the subject-matter disclosed herein on their own or in any desired combination. The dimensions and proportions of the components shown in the figures are not necessarily to scale.

FIG. 1 shows, in schematic form, an own motor vehicle in which at least a first and a second other vehicle are detected in a region in front of and behind the own motor vehicle by means of a first control system.

FIG. 2 shows, in schematic form, a place/time diagram of the own motor vehicle and of a first and a second other vehicle.

DETAILED DESCRIPTION OF THE DRAWINGS

FIG. 1 shows, in schematic form, an own motor vehicle 10 which is situated in the right-hand lane 12 of a carriageway 14. Adjacent to the right-hand lane 12 there is a further, left-hand lane 16 of the carriageway 14. The right-hand lane 12 and the left-hand lane 16 of the carriageway 14 are separated from one another by a dashed carriageway marking 18.

In front of the own motor vehicle 10 in the direction of travel of the own motor vehicle 10 there is a first other motor vehicle 20 participating in traffic, and behind the own motor vehicle 10 in the direction of travel of the own motor vehicle 10 there is a second other motor vehicle 30 participating in traffic.

The own motor vehicle 10 has at least one surroundings sensor (not shown) which is associated with the own motor vehicle 10 and is mounted thereon. The surroundings sensor can be in the form of a camera, for example, but the use of other surroundings sensors (photo, video, radar, lidar, laser, ultrasound, etc.) is also possible. A radar lobe is shown by a broken line at the front end and at rear end of the own motor vehicle 10. There is additionally associated with the own motor vehicle 10 at least one path or speed sensor, for example the speed sensors of the ABS device of the own motor vehicle 10. The sensor signals of the surroundings sensor and of the speed sensors are fed to a control system (not shown) of the own motor vehicle 10 having processors and actuators. This control system processes the sensor signals of the surroundings sensor and of the speed sensors in a manner which will be described in greater detail below and is adapted to provide triggering of a deceleration of the own vehicle 10 in the form of a recommendation for the driver of the own motor vehicle 10, or to begin such a deceleration (semi-)autonomously via an electrical and/or hydraulic brake system of the own motor vehicle 10.

The control system is adapted for use in the own motor vehicle and is designed to detect motor vehicles travelling in front of and behind the own motor vehicle from the speed and surroundings data. For this purpose, the surroundings sensor acquires the surroundings data representing an area in front of, next to and/or behind the own motor vehicle. These surroundings data contain, for example in the driving situation from FIG. 1, the first other motor vehicle 20 participating in traffic in front of the own motor vehicle 10 and the second other motor vehicle 30 participating in traffic behind the own motor vehicle 10. In particular, movements and resulting distances, (relative) speeds and (relative) accelerations of the first and/or second other motor vehicle 20, 30 relative to its lane 12 or to the own motor vehicle 10 are contained in the surroundings data.

From the movements of the first and/or second other motor vehicle 20, 30 and movements of the own motor vehicle 10, the control system obtains a current driving situation of the own motor vehicle 10 with respect to the current driving situation of the first and second other motor vehicles 30.

Based on the current driving situation of the own motor vehicle 10 with respect to the current driving situation of the first and second other motor vehicles 20, 30, the control system repeatedly (continuously) calculates a measure of a brake requirement in the form of (i) a necessity measure, (ii) a time until the beginning of a deceleration and (iii) a deceleration measure for the own vehicle 10. The necessity measure represents a probable likelihood and/or a probable intensity of a possible collision with the first and/or second other motor vehicle 20, 30. The calculated time until the beginning of a deceleration is based primarily on a probable collision with the first other vehicle 20 in front of the own vehicle. The same applies to the deceleration measure for the own vehicle 10. These two values are calculated by the control system with reference to when and how the deceleration would have to be begun in order to avoid the probable collision, the situation of the second other motor vehicle 30 being disregarded.

Since the current driving situation of the own motor vehicle 10 with respect to the current driving situation of the second other vehicle 30 is also available to the control system, this current driving situation is likewise included. On the one hand, the control system must avoid a rear-end collision of the own motor vehicle 10, and on the other hand, due to knowledge of the current driving situation of the own motor vehicle 10 with respect to the second other motor vehicle 30, it can also contribute towards preventing a rear-end collision of the second other motor vehicle 30 with the own motor vehicle 10.

Such a rear-end collision of the second other motor vehicle 30 with the own motor vehicle 10 can occur, for example, because, in order to avoid a rear-end collision with the first other motor vehicle 20 in front of the own vehicle, the own motor vehicle 10 would have to brake late and therefore with great braking deceleration. In order to avoid this, the control system triggers a deceleration of the own vehicle 10, provided that/as soon as the necessity measure exceeds a predetermined threshold, at a point in time which is before the determined time until the beginning of a deceleration, the triggered deceleration being less than the deceleration measure for the own vehicle 10 determined above. The driver, or the adaptive cruise control (ACC) system, of the second other vehicle 30 thus has sufficient (or at least more) time, even at a small distance from the own vehicle 10, to reduce his speed and increase his distance from the own motor vehicle 10 and thus avoid a rear-end collision with the own motor vehicle 10.

The control system of the own motor vehicle 10 triggers the deceleration of the own vehicle 10 in the form of a recommendation for the driver of the own motor vehicle 10 or begins the deceleration (semi-)autonomously via a brake system of the own motor vehicle 10.

After triggering the deceleration of the own vehicle 10, the control system repeatedly determines the driving situation of the own motor vehicle 10 with respect to the current driving situation of the first and second other motor vehicles. It also repeatedly determines a probable intensity of a possible collision with the first and/or second other motor vehicle 20, 30. In dependence on the probable intensity of a possible collision with the first and/or second other motor vehicle 20, 30, the control system changes the measure of the deceleration that is begun.

A measure of the probable intensity of a possible collision with the first and/or second other motor vehicle 20, 30 is a current relative acceleration, a current relative speed, and/or a current distance between the own motor vehicle 10 and the first end/or second other motor vehicle 20, 30.

Another measure of the probable intensity of a possible collision with the first and/or second other motor vehicle 20, 30 is an intention model of the driver of the own motor vehicle 10 and/or intention models of the first and/or second other motor vehicle 20, 30.

FIG. 2 illustrates a space/time diagram of the own motor vehicle, of a first other vehicle and of a second other vehicle.

As is illustrated in the diagram, the own motor vehicle 10 is travelling behind the first other motor vehicle 20 at a slightly higher speed than that vehicle, so that the distance between these two motor vehicles is becoming smaller. At the same time, the second other motor vehicle 20 is following the own motor vehicle 10 at approximately the same speed and at a small distance.

The control system in the own motor vehicle 10 determines at time x0, on the basis of the acquired surroundings data, that a collision X1 with the first other motor vehicle 20 in front of the own motor vehicle 10 could occur if the distance between the own motor vehicle 10 and the first other motor vehicle 20 continues to become smaller. The control system in the own motor vehicle 10 also determines at time x0, on the basis of the acquired rearward surroundings data, movements of the second other motor vehicle 30 participating in traffic behind the own motor vehicle 10 by means of the at least one surroundings sensor. From the movements of the second other motor vehicle 30, the movements of the first other motor vehicle 20 and movements of the own motor vehicle 10, the control system determines a current driving situation of the own motor vehicle 10 with respect to the current driving situation of the first and second other motor vehicles 20, 30.

For this purpose, the control system repeatedly determines, based on the current driving situation of the own motor vehicle 10 with respect to the current driving situation of the first other and second other motor vehicles 20, 30, a measure of a brake requirement in the form of (i) a necessity measure, (ii) a time until the beginning of a deceleration and (iii) a deceleration measure for the own vehicle 10. At this time t0, the necessity measure in the present example is 60%, which has exceeded a predetermined measure of 55%, and the time until the beginning of a (usual) deceleration would be (t1-t0), and the deceleration measure for the own vehicle 10 that is to be begun in order to avoid the collision would in the present example be 0.4 g (g=9.81 m/s$^2$). In other words, the control system would begin a deceleration of 0.4 g at time t1. The dashed portion of the graph of the own motor vehicle 10 is not actually travelled by the vehicle; rather, this dashed portion serves to illustrate the possible collision X1 with the first other motor vehicle 20.

Instead, because the necessity measure has exceeded the predetermined measure of 55%, the control system triggers in the own motor vehicle 10 at a time t2, which is before the time t1, a deceleration of the own vehicle 10 of 0.2 g in the present example, which is less than the determined deceleration measure (in the present example 0.4 g) for the own vehicle 10.

This is illustrated in the diagram of FIG. 2 in that the continuous curve of the graph of the own vehicle 10 becomes flatter at time t2. With a deceleration in the present example of 0.4 g, the second other motor vehicle 30 behind the own vehicle would have much less opportunity to reduce its speed in order to avoid a collision X2. The deceleration of the own vehicle 10 by 0.4 g is here illustrated as a dashed portion beginning at time t2, which leads to the possible collision X2 with the second other motor vehicle 30. This represents a major problem, for example, for lorries behind other vehicles.

Since it is assumed in the present example that the second other motor vehicle 30 does not (initially) change its speed, this reduced, but earlier deceleration by 0.2 g would also lead to a collision X3, which is illustrated by the dashed continuation of the flatter portion beginning at time t2. However, because the control system, after triggering the deceleration of the own vehicle 10, continues to repeatedly determine the driving situation of the own motor vehicle 10 with respect to the current driving situation of the first and second other motor vehicles 20, 30 and repeatedly determines a probable intensity of a possible collision with the first and/or second other motor vehicle (20, 30) and, in dependence on the probable intensity of a possible collision with the first and/or second other motor vehicle 20, 30, changes the measure of the deceleration that is begun (in the present example reduces the deceleration to 0.1 g at time t3), none of the possible collisions occurs.

The term "deceleration" is here understood as meaning negative acceleration or slowing down of the respective vehicle. A deceleration of, for example, 1 g would be expressed mathematically as an acceleration of −1 g.

The above-described variants and the structural and operational aspects thereof serve merely for better understanding of the structure, the functioning and the properties; they do not limit the disclosure, for example, to the exemplary embodiments. The figures are partly schematic, important properties and effects in some cases being shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be assigned to the described procedure. Combinations between all the individual implementations in the text, that is to say in every section of the description, in the claims, and also combinations between different variants in the text, in the claims and in the figures, are also included. The claims also do not limit the disclosure and thus the possible combinations of all the indicated features with one another. All the disclosed features are explicitly also disclosed herein individually and in combination with all the other features.

The invention claimed is:

1. A control system for use in an own motor vehicle (10), wherein the own motor vehicle has at least one surroundings sensor arranged to obtain surroundings data to detect motor vehicles in the front and in the rear of the own motor vehicle, wherein the at least one surroundings sensor is adapted to provide, to an electronic control of the control system, the surroundings data representing an area in front of, next to and/or behind the own motor vehicle, and wherein the control system is at least adapted to detect a first other motor vehicle (20) participating in traffic in front of the own motor vehicle (10) by means of the at least one surroundings sensor, detect a second other motor vehicle (30) participating in traffic in the rear of the own motor vehicle (10) by means of the at least one surroundings sensor, determine movements of the first and/or second other motor vehicles (20, 30) relatively (i) to a lane, on which the first and/or second motor vehicles (20, 30) or the own motor vehicle (10) are, or (ii) relatively to the own motor vehicle (10), determine a current driving situation of the own motor vehicle (10) with respect to the current driving situation of the first and second other motor vehicles (30) based on the movements of the first and/or second other motor vehicles (20, 30) and movements of the own motor vehicle (10), based on the current driving situation of the own motor vehicle (10) with respect to the current driving situation of the first and second other motor vehicles (20, 30), repeatedly determine a measure of a brake requirement in the form of (i) a necessity measure, (ii) a time until the beginning of a deceleration and (iii) a deceleration measure for the own vehicle (10), and provided that the necessity measure exceeds a predetermined threshold, trigger a deceleration of the own vehicle (10) at a point in time which lies before the determined time until the beginning of a deceleration, wherein the triggered deceleration is less than the determined deceleration measure for the own vehicle (10).

2. The control system according to claim 1, which is adapted to begin the triggering of the deceleration of the own vehicle (10) in the form of a recommendation for a driver of the own motor vehicle (10) or (semi-)autonomously via a brake system of the own motor vehicle (10).

3. The control system according to claim 2, which is adapted, after triggering the deceleration of the own vehicle (10), repeatedly to determine the driving situation of the own motor vehicle (10) with respect to the current driving situation of the first and second other motor vehicles (20, 30) and repeatedly to determine a probable intensity of a possible collision with the first and/or second other motor vehicle (20, 30) and, in dependence on the probable intensity of a possible collision with the first and/or second other motor vehicle (20, 30), to change the measure of the triggered deceleration that is begun.

4. The control system according to claim 3, wherein a measure of the probable intensity of a possible collision with the first and/or second other motor vehicle (20, 30) is a current relative acceleration, a current relative speed, and/or a current distance between the own motor vehicle (10) and the first and/or second other motor vehicle (20, 30).

5. The control system according to claim 3, wherein another measure for the probable intensity of a possible collision with the first and/or second other motor vehicle (20, 30) is an intention model of the driver of the own motor vehicle (10) and/or intention models of the first and/or second other motor vehicle (20, 30).

6. A control method, wherein, in an own motor vehicle, based on surroundings data obtained by at least one surroundings sensor arranged at the own motor vehicle, motor vehicles in the front and in the rear of the own motor vehicle are detected with the control method, wherein the at least one surroundings sensor is adapted to provide the surroundings data representing an area in front of, next to and/or behind the own motor vehicle, wherein the control method comprises the following steps:

detecting a first other motor vehicle participating in traffic in front of the own motor vehicle, detecting a second other motor vehicle participating in traffic in the rear of the own motor vehicle, determining movements of the first and/or second other motor vehicles relatively (i) to a lane, on which the first and/or second motor vehicles or the own motor vehicle are, or (ii) relatively to the own motor vehicle, determining a current driving situation of the own motor vehicle with respect to the current driving situation of the first and second other motor vehicles from the movements of the first and/or second other motor vehicles and movements of the own motor vehicle, repeatedly determining, based on the current driving situation of the own motor vehicle with respect to the current driving situation of the first and second other motor vehicles, a measure of a brake requirement in the form of (i) a necessity measure, (ii) a time until the beginning of a deceleration and (iii) a deceleration measure for the own vehicle, and provided that the necessity measure exceeds a predetermined threshold, triggering a deceleration of the own vehicle at a point in time which lies before the determined time until the beginning of a deceleration, wherein the triggered deceleration is less than the determined deceleration measure for the own vehicle.

* * * * *